United States Patent [19]

Adams et al.

[11] Patent Number: 4,936,533

[45] Date of Patent: Jun. 26, 1990

[54] MOUNTING ASSEMBLY FOR VEHICLE ACCESSORIES

[75] Inventors: Edward R. Adams, Spring Lake; Wayne Vandenbrink, West Olive; Craig M. Miller, Jenison, all of Mich.

[73] Assignee: Donnelly Corporation, Holland, Mich.

[21] Appl. No.: 271,663

[22] Filed: Nov. 15, 1988

[51] Int. Cl.$^5$ .............................................. B60R 1/04
[52] U.S. Cl. .............................. 248/222.1; 248/224.1; 248/483
[58] Field of Search ............... 248/483, 482, 484, 544, 248/479, 549, 551, 466, 467, 468, 475.1, 476, 481, 489, 205.3, 221.3, 221.4, 221.1, 223.4, 224.1, 224.2, 224.3, 224.4; 403/331, 339, 380; 350/631, 632

[56] References Cited

U.S. PATENT DOCUMENTS

| | | |
|---|---|---|
| 614,503 | 11/1898 | Sackett . |
| 716,713 | 12/1902 | Hughes . |
| 807,888 | 12/1905 | Wallace . |
| 1,030,090 | 6/1912 | Johnson . |
| 1,182,610 | 5/1916 | Wiesman . |
| 1,252,207 | 1/1918 | Walker . |
| 1,720,309 | 7/1929 | Wakefield . |
| 1,794,700 | 3/1931 | McCaskey . |
| 1,826,162 | 10/1931 | Balk . |
| 1,857,050 | 5/1932 | Jones . |
| 2,129,189 | 9/1938 | Alder . |
| 2,168,003 | 8/1939 | Stone . |
| 2,200,158 | 5/1940 | Clarke . |
| 2,239,978 | 4/1941 | Sanford . |
| 2,532,162 | 11/1950 | Goss . |
| 2,577,526 | 12/1951 | Kelly . |
| 2,588,009 | 3/1952 | Jones . |
| 2,771,263 | 11/1956 | Boho . |
| 3,036,803 | 5/1962 | Fiebelkorn . |
| 3,074,680 | 1/1963 | Stewart . |
| 3,131,251 | 4/1964 | Ryan . |
| 3,189,187 | 6/1965 | Guyer, Jr. et al. . |
| 3,211,409 | 10/1965 | Zimmermann . |
| 3,237,898 | 3/1966 | Goss . |
| 3,367,616 | 2/1968 | Bausch et al. . |
| 3,436,049 | 4/1969 | De Claire et al. . |
| 3,589,662 | 6/1971 | Lagrange . |

(List continued on next page.)

FOREIGN PATENT DOCUMENTS

| | | |
|---|---|---|
| 25898 | 5/1956 | Fed. Rep. of Germany . |
| 2153875 | 5/1973 | Fed. Rep. of Germany . |
| 2354551 | 5/1975 | Fed. Rep. of Germany . |
| 2410388 | 9/1975 | Fed. Rep. of Germany . |
| 2535940 | 4/1976 | Fed. Rep. of Germany . |
| 2414075 | 11/1979 | Fed. Rep. of Germany . |
| 2132920 | 11/1972 | France . |
| 2210958 | 7/1974 | France . |
| 2354219 | 10/1976 | France . |
| 58-24595 | 5/1983 | Japan . |
| 2447 | of 1913 | United Kingdom . |
| 489181 | 7/1938 | United Kingdom . |
| 1016563 | 1/1966 | United Kingdom ............. 248/223.4 |
| 1084850 | 9/1967 | United Kingdom . |
| 1196266 | 6/1970 | United Kingdom . |
| 2047519 | 12/1980 | United Kingdom . |
| 2048803 | 5/1983 | United Kingdom . |

Primary Examiner—Blair M. Johnson
Assistant Examiner—Robert A. Olson
Attorney, Agent, or Firm—Price, Heneveld, Cooper, DeWitt & Litton

[57] ABSTRACT

A vehicle accessory mounting assembly is disclosed for securely and stably supporting a rearview mirror or another vehicular accessory on the vehicle windshield or another vehicular surface without the need for an adjustable set screw. The assembly includes a support member slidably received on a base member by spaced sets of mating surfaces. A spring retainer on one of the base and support includes one retainer arm engaging and gripping an opposing, raised rib on the other member. A second retainer arm spaced from the first retainer arm urges the first arm against the rib. Spaced, raised contact areas are provided on the mating surfaces, while spaced sliding contact areas with a relieved area therebetween are provided on another contact surface to prevent movement and/or vibration between the base and support.

37 Claims, 5 Drawing Sheets

U.S. PATENT DOCUMENTS

| | | |
|---|---|---|
| 3,612,469 | 10/1971 | Dennis . |
| 3,631,572 | 1/1972 | Lange . |
| 3,703,270 | 11/1972 | Tomlin . |
| 3,756,637 | 9/1973 | Wildi . |
| 3,848,843 | 11/1974 | Levy . |
| 3,913,876 | 10/1975 | McSherry ............................ 248/903 |
| 3,928,894 | 12/1975 | Bury et al. . |
| 4,105,296 | 8/1978 | Tomlin . |
| 4,105,348 | 8/1978 | Anderson et al. . |
| 4,127,911 | 12/1978 | Cupp et al. . |
| 4,254,931 | 3/1981 | Aikens et al. . |
| 4,283,038 | 8/1981 | Kurtz . |
| 4,346,868 | 8/1982 | Lindner . |
| 4,377,887 | 3/1983 | Valestin . |
| 4,382,572 | 5/1983 | Thompson . |
| 4,422,212 | 12/1983 | Sheiman et al. . |
| 4,455,692 | 6/1984 | Hegge et al. . |
| 4,502,191 | 3/1985 | Savage . |
| 4,524,941 | 6/1985 | Wood et al. . |
| 4,579,309 | 4/1986 | Fujiwara et al. . |
| 4,593,878 | 6/1986 | Stewart . |
| 4,632,348 | 12/1986 | Keesling et al. . |

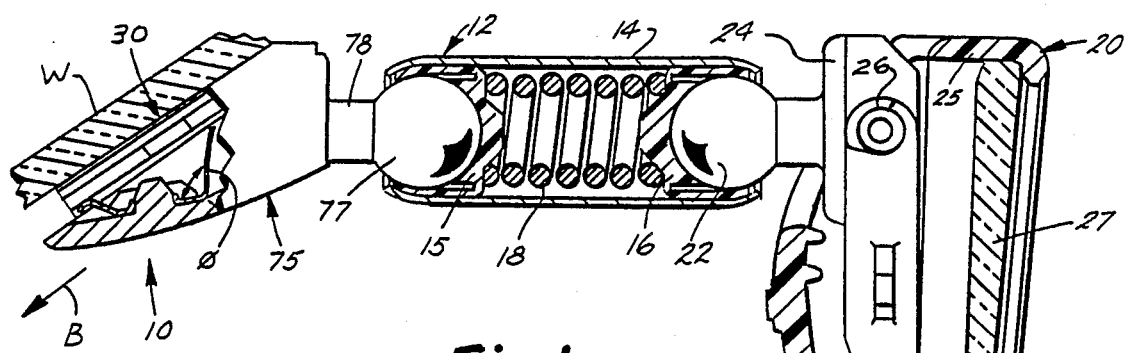
Fig. 1.
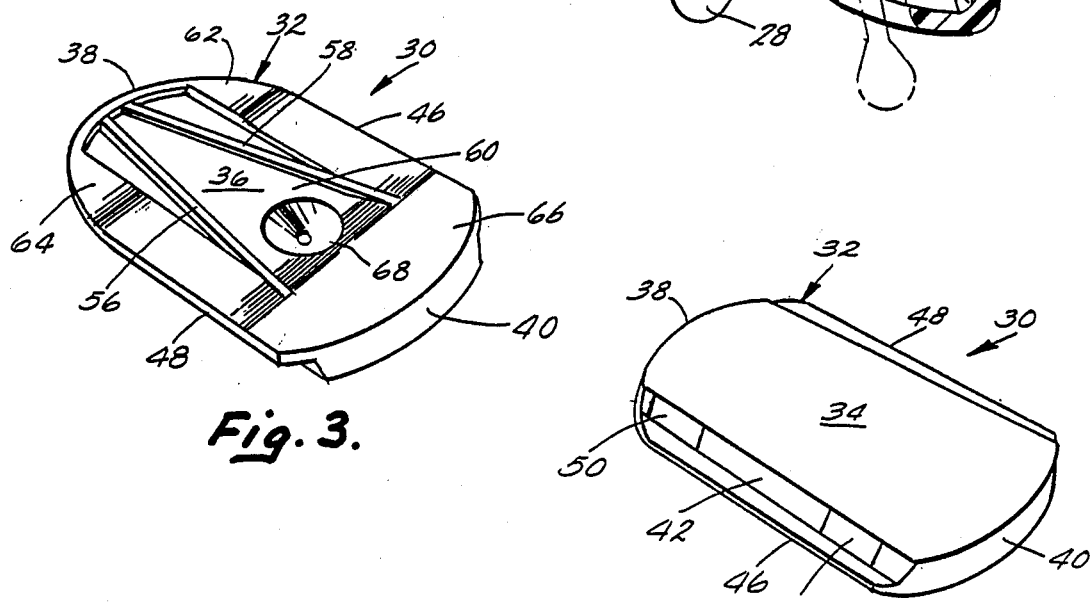
Fig. 3.
Fig. 2.
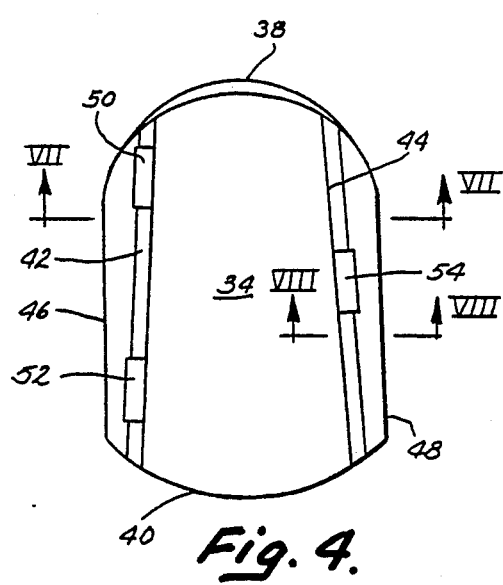
Fig. 4.
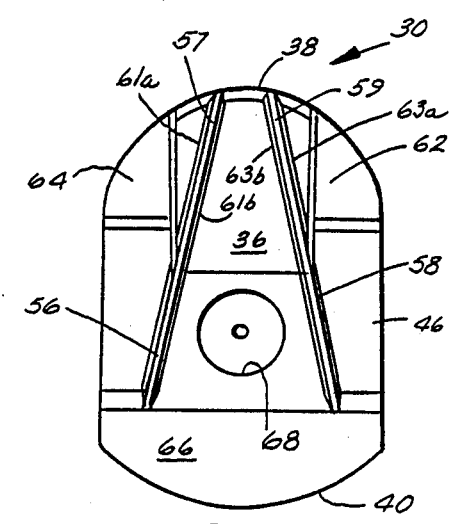
Fig. 5.

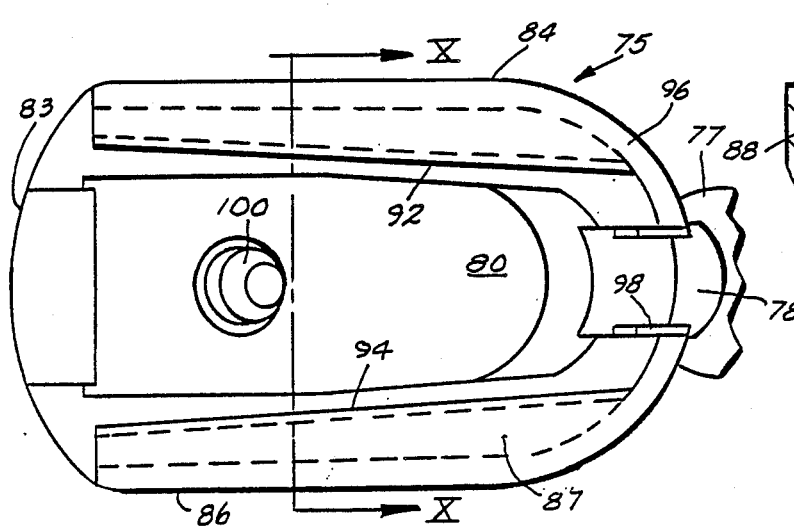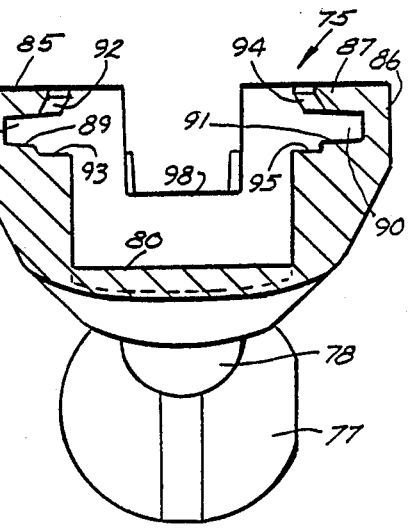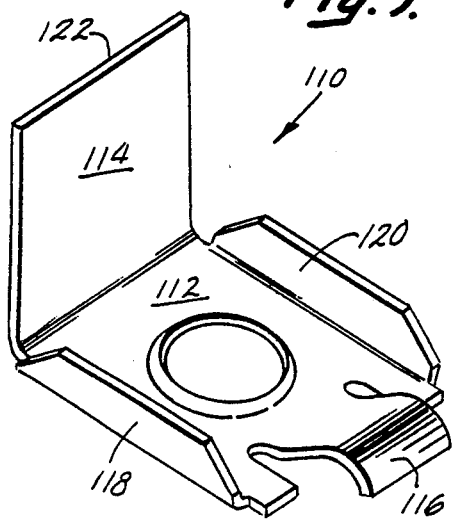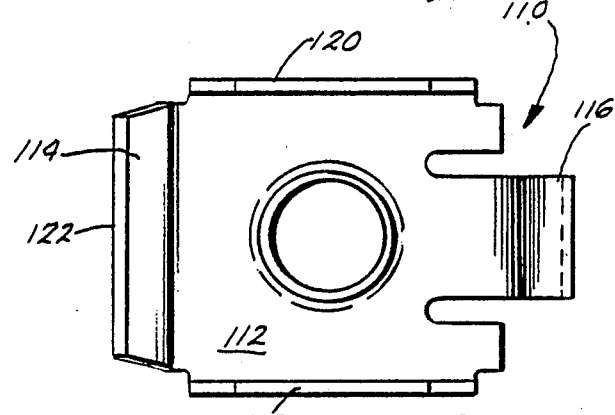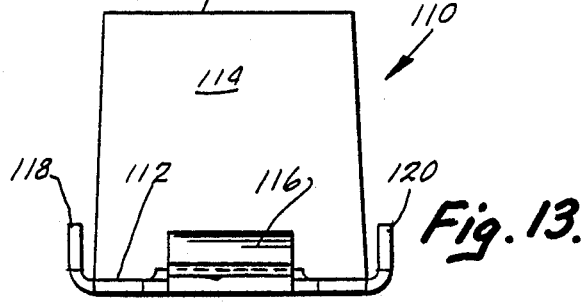

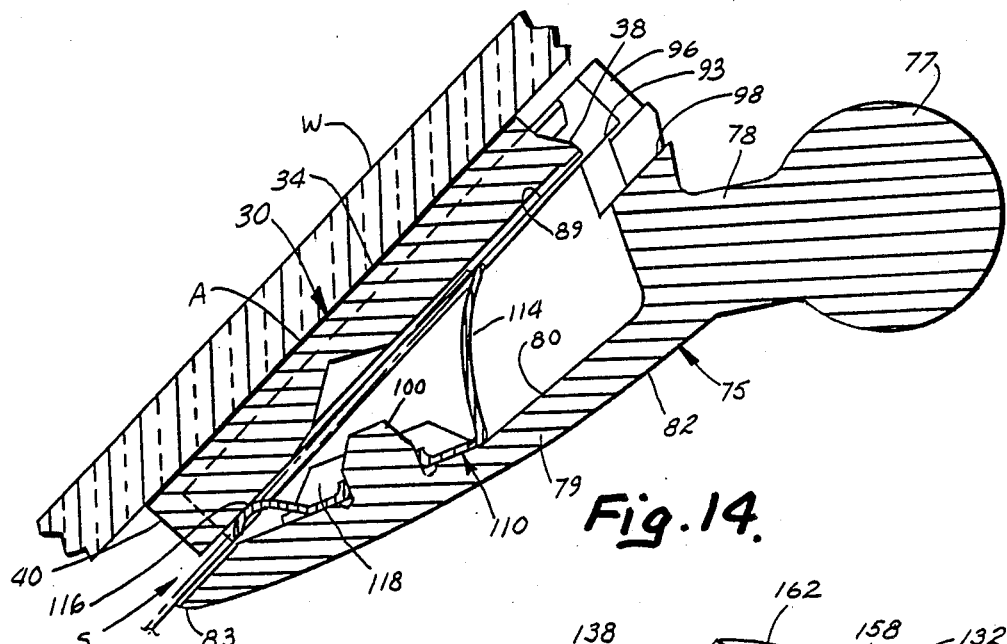
Fig. 14.
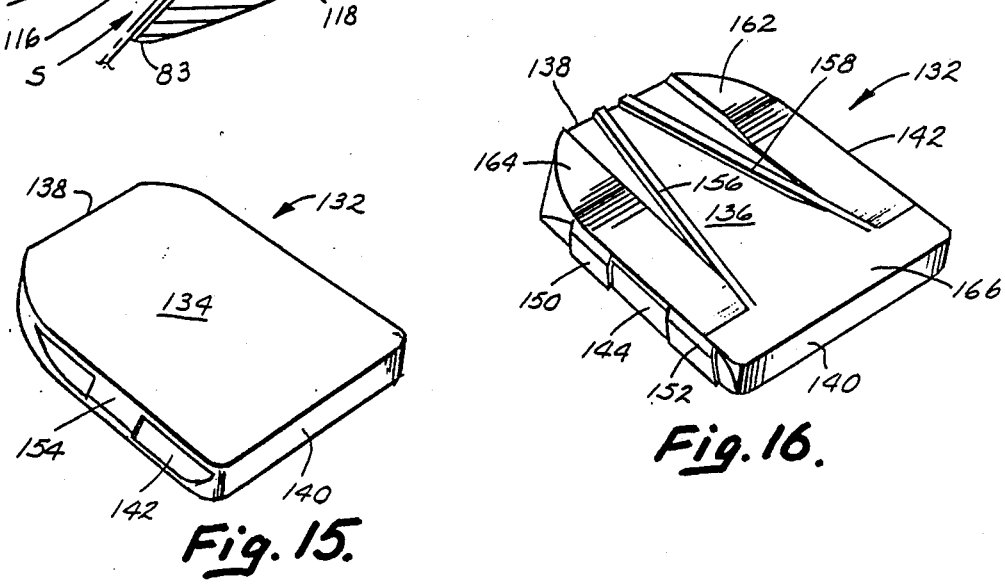
Fig. 15.
Fig. 16.
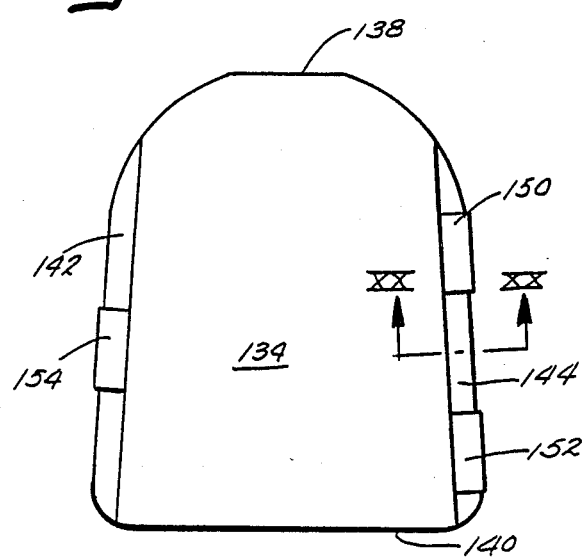
Fig. 17.

MOUNTING ASSEMBLY FOR VEHICLE ACCESSORIES

BACKGROUND OF THE INVENTION

This invention relates to mounting assemblies for supporting vehicle accessories in vehicles, and more particularly, to a mounting assembly for supporting a rearview mirror or other vehicle accessory from a surface such as the inside of the front windshield of a vehicle.

Conventional windshield mounted rearview mirror support assemblies typically include base member adhered to the inside windshield surface and a support member, known in the industry as a "channel mount", slidably fitted thereover. The support member or channel mount usually includes an arm, ball joint or other structure for suspending a rearview mirror assembly in the vehicle compartment for use by the driver of the vehicle. Alternately, the mounting assembly may support other vehicle accessories such as headlight dimming switches or other items useful by persons within the vehicle passenger compartment.

Typically, the support member in a conventional mounting assembly is secured to the base member by a set screw which is tightened during manufacture of the vehicle to hold the accessory securely to the base member on the windshield. However, use of such a set screw has created numerous manufacturing and maintenance problems in such assemblies.

For example, it is difficult to maintain consistent screw threads since the set screws are typically purchased as low priced commodity items with low tolerances. The inconsistency in such threads can result in cross-threading of the screw in its aperture which causes automatic screwdrivers used in vehicle assembly to stop prematurely at a preset stall torque eve though the support is not firmly tightened against the base member. Alternately, the screws may fit so sloppily that there is no torque. Also, the set screw is often stripped out by overtightening because of the improper sizing of the socket to the set screw or a weakness in the threads of the screw itself. Consequently, the support member fits loosely on the base member and creates a perception of poor quality in the rearview mirror or other accessory which is immediately apparent to the purchaser of the vehicle. In addition, looseness at the support for the rearview mirror creates blurred and poor imaging on the mirror surface.

In addition, prior to sliding the support over the base member, should the set screw be inserted too far into its mounting aperture, assembly is prevented until the screw is backed out, causing a loss of time and significant delays in mass production situations.

In the event the set screw is properly tightened on the support member against the base member, it typically generates a force of approximately 900 pounds at the screw tip. This causes the base member and support member to tightly conform to one another but can also cause cracking, breakage or other failure of the support allowing the rearview mirror to fall, especially when the vehicle is subjected to vibration on rough roads. In addition, since many of the supporting channel mounts are manufactured from zinc, the high force generated by the set screw can create creep between the parts of the assembly over time and a consequent relaxation in the joint because of thermal cycling. Again, this results in a loose fit, poor quality perception and imaging problems.

In the past, mounting assemblies eliminating the set screw have been tried with less than satisfactory results. For example, see U.S. Pat. Nos. 4,254,931 and 4,632,348, both of which include spring members substituted for the set screws. In such assemblies, the springs have generally been inadequate to maintain a tight fit over the life of the assembly. Up and down rocking motion or side-to-side lateral motion is still experienced resulting in vibration and blurred images.

Yet other attempts have combined springs or resilient parts with set screws as for example in U.S. Pat. No. 3,928,894. Such assemblies do not eliminate the problems inherent in the use of set screws nor have they overcome the vertical and lateral motion an vibration encountered in prior known spring biased mounting assemblies.

Accordingly, the present invention was conceived in an effort to overcome the above and other problems and to provide a more secure, stable rearview mirror and/or vehicle accessory mounting assembly without the need for a set screw.

SUMMARY OF THE INVENTION

The present invention provides a vehicle accessory mounting assembly for securely and stably supporting a rearview mirror or other vehicle accessory on a vehicle windshield or another vehicular surface without the need for an adjustable set screw.

In one form, the mounting assembly includes a base for attachment to a support surface in a vehicle, and a support for supporting a vehicle accessory having receiving means for slidably receiving the base with a first surface of the base opposed to first surface of the support and retainer means on the first surface of the support for engaging and holding the base on the support. Rib means are provided on the first surface of the base for engaging the retainer means, the rib means having a retainer engaging surface facing the support for engaging and holding a retainer arm anywhere therealong. The retainer means include a first resilient retainer arm engaged with and gripping the retainer engaging surface of the rib means at a gripping position determined when the receiving means firmly and tightly engages the base. A second resilient retainer arm engages the base at a position spaced from the gripping position to urge the first retainer arm against the retainer engaging surface whereby the support is stably held on the base until the first retainer arm is released.

Preferably, the rib means include a pair of ribs extending at an angle to one another such that they are arranged in an inverted V and diverge from a position adjacent one end of the base. This allows the first retainer arm to engage different positions along the ribs at different longitudinal assembly positions thereby automatically accommodating differences in the manufactured dimensions of the base and support. The retainer means preferably is a spring clip pushed over a mounting stud on the support and includes a base from which the first and second spring arms extend upwardly. The first spring arm preferably tapers from the base outwardly to a sharp free end edge which securely grips the retainer engaging surface of the ribs. The second spring arm preferably includes a rounded surface for engaging the base.

In a preferred form, the base is formed in one piece from sintered metal and has a relative hardness less than that of the spring clip.

In other aspects of the invention, the base and support include spaced pairs of cooperating surfaces for slidably mounting the support on the base. One of the pair of cooperating surfaces includes a spaced pair of raised contact areas extending between the cooperating surfaces. The other of the pair of cooperating surfaces includes at least one raised contact area extending therebetween. These raised areas provide consistent contact between the cooperating surfaces to stabilize mounting and prevent movement and/or vibration between the base and support.

Preferably, the raised contact areas are provided on the side surfaces of the base member and are positioned in a triangular arrangement. Also, the side surfaces of the base are preferably inclined toward one another and converge toward the top end of the base to form a double taper for holding the support member on the base.

In yet another aspect of the invention, the base includes a front surface slidably engaging an opposed surface on the support, th®front surface including at least three spaced sliding contact areas and a relieved area therebetween. The sliding contact area provide consistent engagement between the base and support and enhance the uniform, stable contact between the cooperating surfaces by eliminating problems of differing manufacturing dimensions due to warpage in the base during manufacture. Preferably, the sliding contact areas are provided adjacent the diverging ribs engaged by the spring clip on the support member.

The present invention therefore provides numerous advantages not obtained in prior mounting assemblies, either with or without a set screw. The invention provides firm, tight, consistent support for the rearview mirror or accessory mounting support on the base without relative rocking or lateral motion and/or vibration between the base and support. Such tight, firm fit is maintained over the life of the assembly all without the use of a set screw even though the base and support are manufactured with varying tolerances and a range of fits. The firm, tight vibration-free support between the assembly parts eliminates the need for high stress tightening of one part with respect to the other there by avoiding failure due to cracking or breaking of the support while eliminating blurred images in the rearview mirror. In addition, the present invention saves time and avoids delay in manufacturing, lowers rejection rates for the mounting assemblies, and significantly reduces customer complaints for the finished product.

These and other objects, advantages, purposes and features of the invention will become more apparent from a study of the following description taken in conjunction with the drawings.

BRIEF DESCRIPTION OF THE DRAWINGS

FIG. 1 is a sectional side elevation of the mounting assembly of the present invention shown supporting a day/night rearview mirror assembly from the inside surface of a vehicle windshield;

FIG. 2 is a perspective view of the rear side of the base member of the mounting assembly of FIG. 1;

FIG. 3 is a perspective view of the front side of the base member shown in FIGS. 1 and 2;

FIG. 4 is a plan view of the rear side of the base member shown in FIGS. 2 and 3;

FIG. 5 is a plan view of the front side of the base member shown in FIGS. 2-4;

FIG. 6 is a side elevation of the base member shown in FIGS. 2-5;

FIG. 7 is a sectional end elevation of the base member taken along plane VII—VII of FIG. 4;

FIG. 8 is an enlarged, fragmentary, sectional end elevation of one side of the base member shown in FIGS. 2-7;

FIG. 9 is a plan view taken from the rear of the support member of ,the mounting assembly of FIG. 1;

FIG. 10 is a sectional end view of the support member taken along plane X—X of FIG. 9;

FIG. 11 is a perspective view of the spring clip used in the mounting assembly of FIG. 1;

FIG. 12 is a plan view of the spring clip shown in FIG. 11;

FIG. 13 is an end elevation of the spring clip of FIGS. 11 and 12;

FIG. 14 is an enlarged, sectional side elevation of the mounting assembly of FIG. 1;

FIG. 15 is a perspective view taken from the rear side of an alternate embodiment of the base member of the present invention;

FIG. 16 is a perspective view taken from the front side of the base member of FIG. 15;

FIG. 17 is a plan view of the rear side of the base member of FIGS. 15 and 16;

DESCRIPTION OF THE PREFERRED EMBODIMENTS

Figure 18:
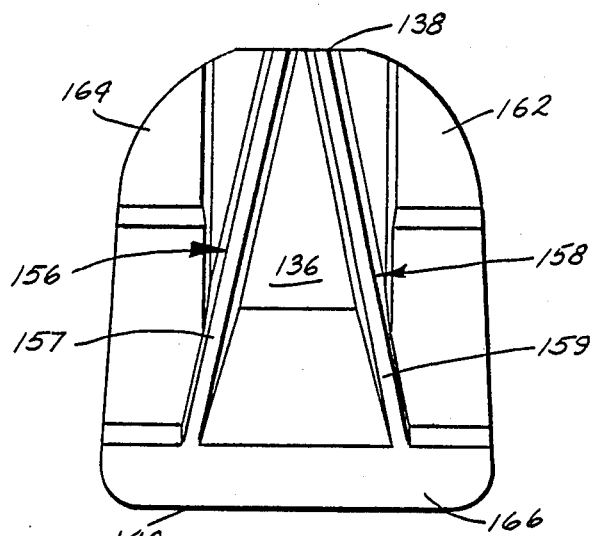
FIG. 18 is a plan view of the front side of the front surface of the base member of FIGS. 15-17.
Figure 20:
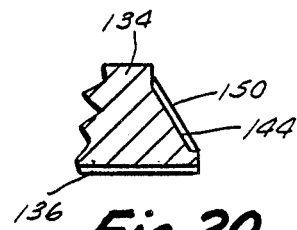
FIG. 20 is a fragmentary, sectional end elevation of a portion of the base member taken along plane XX—XX of FIG. 17.
Figure 19:
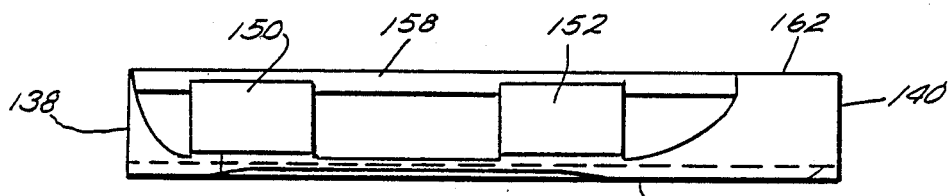
FIG. 19 is a side elevation of the base member of FIGS. 15-18.

Referring now to the drawings in greater detail, FIG. 1 illustrates a first embodiment 10 of the accessory mounting assembly for vehicles embodying the present invention. Preferably, assembly 10 is attached to the inside surface of a vehicle windshield W such that the assembly is supported at an upwardly inclined angle as shown in FIG. 1 The assembly includes an elongated base member 30 adhered to the glass windshield surface by a layer A (FIGS. 14, 23) of conventionally knoWn metal-to-glass adhesive such as polyvinyl butyral available from Monsanto Company of St. Louis, Miss. A support member or "channel mount" 75 is slidably received over the base member and includes an outwardly extending ball member 77 which adjustably supports a rearview mirror mounting arm 12 and a rearview mirror assembly 20 thereon in cantilevered fashion such that they project into the vehicle passenger compartment for use by the vehicle driver. Although not forming any part of the present invention, a typical rearview mirror assembly 20 and mounting arm 12 includes a swaged, one piece tubular member 14 enclosing plastic ball cup 15, 16 forced outWardly by a compression spring 18 against the ends of tube 14 and ball member 77 and second ball member 22 extending rearwardly from rearview mirror assembly 20. Ball member 22 projects from a pivot actuator 24 rotatably mounted within rearview mirror housing 25 on pivot shafts 26. Housing 25 encloses and retains a prismatic mirror element 27 having nonparallel front and back surfaces. A pivot lever 28, supported on a lower set of pivot shafts 29 and joined integrally to the lower edge of pivot actuator 24, may be moved forwardly and rearwardly to pivot housing 25 and prism 27 between day and night reflective positions about shafts 26. In the day position, substantially all of the light entering the vehicle from the rear is reflected to the eyes of the driver while in the night position only a significantly reduced amount of light is so reflected, thereby reducing glare and improving the driver's night vision. As will be understood, vibration-free support of rearview mirror assembly 20 on mounting arm 12 by mounting assembly 10 greatly enhances day or night vision for the driver via mirror element 27 by preventing blurring.

As shown in FIGS. 2–8, base member 30 includes an elongated body 32 preferably formed from sintered stainless steel, although other metals, plastics or other materials and other forming processes could also be used. Body 32 includes front and rear surfaces 34, 36, rounded top and bottom surfaces 38, 40, and converging, inclined, opposing side surfaces 42, 44. Rear surface 34 is substantially planar over its entire extent and is adapted to be adhered by the conventionally known metal-to-glass adhesive mentioned above to the inside surface of a glass windshield in a vehicle.

As is best seen in FIGS. 2 and 6–8, a pair of outwardly projecting retaining flanges 46, 48 are provided adjacent the inclined, converging side surfaces 42, 44 respectively. Retaining flanges 46, 48 extend substantially parallel to the front and rear surfaces 34, 36 and, along with side surfaces 42, 44, are adapted to engage mating, cooperating retaining flanges 85, 87 provided on support member 75 as explain ⓇD hereinafter to hold the support member, and any supported rearview mirror or other vehicle accessory, on base 30 when it is attached to the windshield W.

As is also shown in FIGS. 2, 7 and 8, side surfaces 42, 44 are inclined toward one another and toward rear surface 34 for retaining support member 75 thereon. These side surfaces also converge toward top end 38 of base member 30 such that a double taper locking arrangement for the support member on the base member is provided as is explained more fully hereinafter. Likewise, the edges of flanges 46, 48 also converge toward the top of the base member but to a lesser extent than side surfaces 42, 44. Top end 38 of the base member also is inclined outwardly away from the rear surface 34 (FIGS. 6 and 14) although such inclined end does not engage support 75.

In order to provide firm, stable contact between base member 30 and the support member 75, regardless of manufactured dimensions in those parts, raised contact areas 50, 52 are provided at spaced positions adjacent the top and bottom of the base member on side surface 42, while a single raised contact area 54 is provided on side surface 44 (FIGS. 2 and 6–8). Contact areas 50, 52 and 54 are positioned in a triangular arrangement with area 54 spaced intermediate the longitudinal positions of areas 50, 52. Preferably, areas 50, 52 and 54 are raised about 0.007 inches above the substantially planar surfaces of sides 42, 44 such that they provide the primary contact with the retaining flanges 85, 87. Thus, precision manufacturing tolerances for base 30 and support 75 are unnecessary since the triangularly arranged contact surfaces 50, 52 and 54 provide secure, firm engagement with the retaining flanges regardless of manufacturing variations in the side surfaces 42, 44 or flanges 85, 87. Although a single contact area 54 is shown on side 44, it is also possible to include a pair of contact areas on that side surface which, preferably, would be spaced apart along that side as are surfaces 50, 52. Alternately, area 54 could be increased in size such that its total area is equivalent to the total area of areas 50 and 52 together, or possibly even larger.

As is best seen in FIGS. 3 and 5, the front surface 36 of base 30 includes a pair of raised, rectilinear ribs 56, 58 positioned in the shape of an inverted V and diverging from one another from a position adjacent the top end 38 of surface 36 as they extend downwardly toward bottom end 40. Each of the ribs includes a generally planar top surface 57, 59 generally coplanar with the top surface of the other rib and outwardly converging side surfaces 61a, 61b and 63a, 63b providing the rib with a tapered shape in section (FIG. 8) which eases release from the sintered metal press or forming machinery during manufacture of base 30. Although ribs 56, 58 could have another sectional shape such as square, rectangular, curved or radiused, the surfaces 57, 59 of the ribs should have sufficient area to firmly engage and hold an edge of spring clip 110 as explained below.

Ribs 56, 58 lie in an area 60 recessed below the plane of surfaces 57, 59, which area extends between the ribs and on either side thereof. In addition, however, raised, sliding contact areas 62, 64 are provided on either side of the diverging ribs adjacent the top end 38 of the base 30 while a single, continuous raised, sliding contact area 66 is provided below the ends of ribs 56, 58 at the bottom end of surface 36 of base 30. Recessed area 60 extends between these three spaced sliding contact areas. Such areas provide uniform, consistent contact between the front surface 36 of base member 30 and the cooperating surfaces of support member 75 and avoid the problems of attempting to maintain contact over the entire length of front surface 36 with the support member mating surfaces thereby eliminating problems due to warpage in manufacture of the sintered metal base member.

As is shown in FIGS. 3, 5 and 7, a conical recess 68 may be provided approximately two-thirds of the distance along the length of base member 30 on front surface 36 to allow this base member to fit older, more conventional support members requiring the use of a set screw. However, recess 68 is unnecessary for the proper functioning of the present invention.

Referring now to FIGS. 1 and 9–14, support member or channel mount 75 is preferably formed from zinc or other relatively soft cast metal although other materials including plastics and other forming processes could also be used. Support member 75 includes an elongated, outwardly protruding, rounded body 79 having an interior recess 80 therein. Body 79 extends outwardly on each side from a front surface 82 to include longitudinally extending, L-shaped retaining flanges or legs 84, 86 along opposite sides. Ball member 77 extends outwardly on neck 78 adjacent top end 96 of body 79 on front surface 82. Front surface 82 terminates at bottom end 83.

Retaining flanges 84, 86 converge toward one another from bottom end 82 of the support member toward top end 96 and include inwardly extending flanges 85, 87 which define recesses 88, 90 corresponding in shape to the sides of base member 30 defined by side surfaces 42, 44 and flanges 46, 48. Flanges 85, 87 include inside surfaces 92, 94 which match the incline and converging taper of side surfaces 42, 44 on base member 30. Flanges 84, 86 extend upwardly and curve around the top end of the support to form a top wall 96. A recess or cutout 98 in top wall 96 is provided for use in some applications of the support member where wiring must extend from the interior recess 80 through the top wall. However, recess 98 has no application in the present invention.

Spaced below retaining flanges 85, 87 are sliding contact surfaces 89, 91 which are raised slightly above surfaces 93, 95 adjacent the edge of interior recess 80. Sliding contact surfaces 89, 91 are adapted to receive and slidably engage raised, sliding contact areas 62, 64, 66 on front surfaces 36 of base 30. A stud 100 integral with body 79 of support 75 extends inwardly into interior recess 80 for mounting spring clip 110 for retaining the support member 75 on base member 30 as explained hereinafter. Sliding contact surfaces 89, 91 also extend at a slight, longitudinal angle to surfaces 93, 95 to provide an access space S (FIG. 14 for insertion of a removal tool (FIGS. 24, 25) to engage spring clip 110 when removal of support 75 from base 30 is desired as is also explained more fully hereinafter.

As is shown in FIGS. 11-13, spring clip 110 is adapted to be pushed over and frictionally engaged with the cylindrical side surfaces of stud 100 prior to mounting of support 75 on base 30. Preferably, spring clip 110 is formed from spring steel or other resilient material and includes a substantially planar base 112, a first resilient, spring-like retaining arm 114 extending from one edge of base 112 at an angle $\phi$ of approximately 100 degrees to base 112 (FIG. 1), and a second resilient, spring-like retaining arm 116 bent upwardly from an edge of base 112 generally opposite retaining arm 114 but somewhat narrower in width than arm 114 to allow insertion of a removal tool therearound. Short stiffening flanges 118, 120 extend along the remaining two edges of base 112 to provide rigidity for the spring clip. Retaining arm 114 has a tapered configuration which is narrower at its free end edge 122 than at base 112. End edge 122 is also rectilinear and maintained with a very sharp corner between its end surface and the inside surface of the arm for biting, gripping engagement with retaining surfaces 57, 59 of ribs 56, 58 as explained hereinafter. Second retaining arm 116, however, has a rounded upper surface adapted to slide easily over the lower portion of front surface 36 of base 30 in sliding contact area 66. The relative hardnesses of base member 30 and spring member 110 are carefully selected such that the spring member will properly grip and engage surfaces 57, 59 of ribs 56, 58. Preferably, base member 30 has a hardness of about Rockwell B75 while spring clip 110 has a hardness on the Rockwell C scale of between about 40 and 50. A preferred form of spring clip 110 may be obtained from Tinnerman Engineered Fasteners Division of Eaton Corporation in Southfield, Mich.

As will now be understood from FIGS. I and 14, support member 75 with spring clip 110 mounted therein is slidably assembled over base member 30 after base 30 has been adhered to the inside surface of windshield W. Bottom end 83 of support 75 is aligned with top end 38 of base 30 such that flanges 46, 48 are received in the ends of flange receiving openings 88, 90 in the support member. Support 75, with any rearview mirror or other accessory attached thereto, is then slid downwardly in the direction of arrow B in FIG. 1 with sliding contact areas 62, 64, 66 engaging surfaces 89, 91 until raised contact areas 50, 52 and 54 along opposed side surfaces 42, 44 firmly engage inclined surfaces 92, 94 on the inner edges of flanges 85, 87. At the same time, the rounded upper surface of second retaining arm 116 rides up and over end 38 of base 30 and downwardly along the base to surface 66. Then the sharp corner on end 122 of first retaining arm 114 of spring clip 110 rides up and over the end 38 of base 30 and slides along the retainer engaging surfaces 57, 59 of ribs 56, 58. Second retaining arm 116 urges support 75 away from base member 30 at a position spaced from the position at which first retaining arm 114 contacts ribs 56, 58. This prevents longitudinal rocking of the support on base 30, urges contact areas 50, 52 and 54 tightly against surfaces 92, 94 and first retaining arm 114 against surfaces 57, 59 of the ribs. Both arms 114, 116 are slightly bowed in configuration when engaged with base 30 (FIG. 14). The first retaining arm extends at an angle to the plane of surfaces 57, 59 of ribs 56, 58 and, therefore, bites into and grips the surfaces of the ribs to resist and prevent withdrawal of the support in the opposite direction until it is released with one of the tools inserted in space S described hereinafter. As will be understood, because of the varying tolerances and dimensions encountered in various parts in the manufacture of base 30 and support 75, the spacing between flanges 85, 87 and surfaces 89, 91 varies somewhat from support to support. Similarly, the spacing and positioning of side surfaces 42, 44 and raised contact areas 50, 52 and 54 likewise varies. However, when assembled, support 75 is slid over base 30 on areas 62, 64 and 66 as far as necessary to provide proper firm and stable contact of areas 50, 52 and 54 with surfaces 92, 94 on retaining flanges 85, 87 of the support. The spaced retaining arms of the spring clip 110 will provide proper gripping and retention for the support on the base regardless of where the base comes to rest within the retaining flanges of the support. This is because the free end edge 122 of arm 114 will bite simultaneously into the adjacent surfaces 57, 59 of ribs 56, 58 anywhere along their length while maintaining proper retaining contact. Thus, unlike prior assemblies, it is not necessary that base member 30 be inserted within support 75 a specified distance since proper retention will occur wherever base member 30 comes to rest within the support regardless of manufacturing tolerances. Ribs 56, 58 are divergent so that different portions of end edge 122 will engage surfaces 57, 59 at each longitudinal position of base 30 in support 75. Hence, if taken apart and reassembled, with base 30 stopping at a different position in support 75, fresh portions of edge 122 will engage rib surfaces 57, 59 for tight, firm retention.

An alternative embodiment 130 of the mounting assembly is shown in FIGS. 15-23. Mounting assembly 130 includes a modified base member 132 which is slightly shorter than base member 30 but includes substantially similar features. Thus, base member 132 includes front and back surfaces 134, 136, top and bottom end surfaces 138, 140 and opposing side surfaces 142, 144. Rear surface 134 is adapted to be adhered to the inside surface of windshield W. Opposing side surfaces 142, 144 are inclined toward one another and converge toward top end 138 and include triangularly arranged, raised contact areas 150, 152 and 154. Also, front surface 136 includes diverging ribs 156, 158 which are tapered in section and have planar top surfaces 157, 19 as in base 30 as well as spaced, sliding contact areas 162, 164 and 166 as in base 30.

Figure 21:
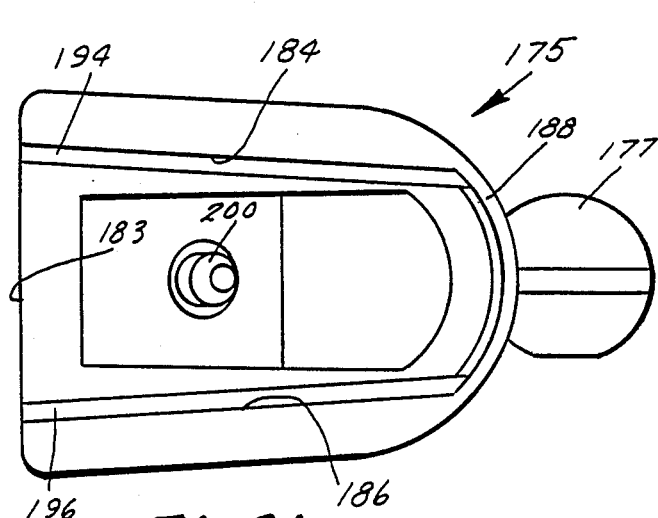
FIG. 21 is a plan view taken from the rear side of an alternate embodiment of a support member to be used in conjunction with the base member of FIGS. 15-20.
Figure 22:
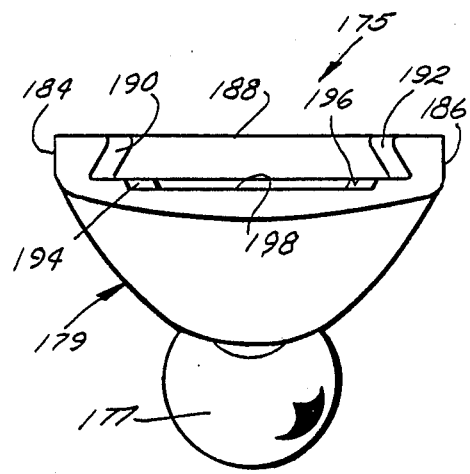
FIG. 22 is an end elevation of the support member of FIG. 21.
Figure 23:
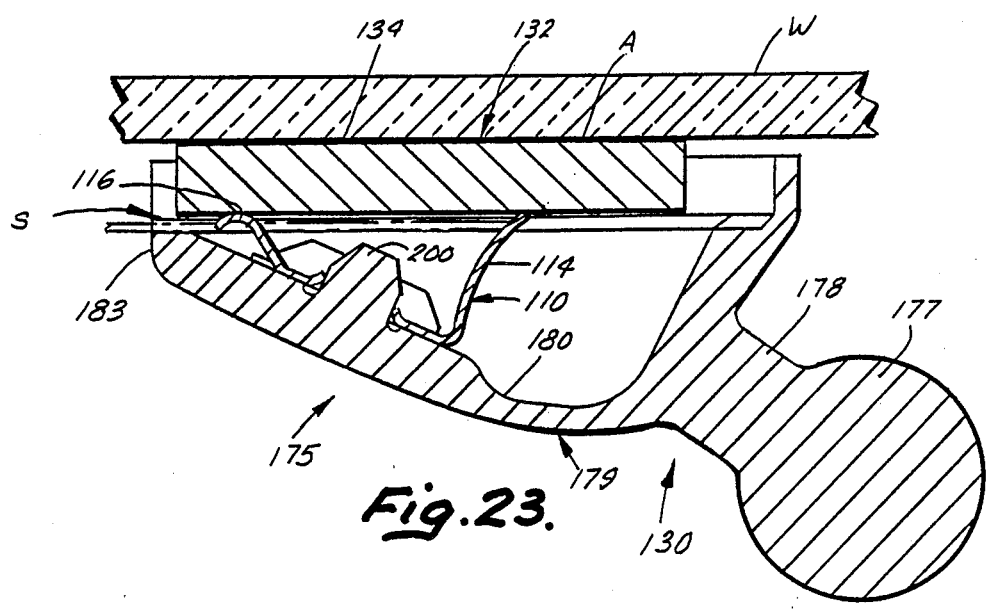
FIG. 23 is an enlarged, sectional side elevation of a mounting assembly including the base member and support members of FIGS. 15-22.

Support 175 of assembly 130 is slightly modified from support 75 in assembly 10. As shown in FIGS. 21–23, support member 175, which is preferably cast from zinc or another cast metal or other material such as plastic, includes a ball member 177 extending outwardly from body 179 on neck 178 for support of a rearview mirror support arm or another vehicle accessory. Like support 75, modified support 175 includes a rearwardly facing interior recess 180 and a front surface 182. Body 179 extends rearwardly to define sidewall 184, 186 and a curved top end wall 188. Interior surfaces 190, 192 of sidewalls 184, 186 are inclined inwardly toward one another and also converge toward each other toward the top wall 188 such that the interior recess corresponds in shape to base sides 142, 144 and includes a double taper for secure retention of the base member. Lower surfaces 194, 196 adjacent sidewalls 190, 192 are adapted to slidingly engage and receive sliding contact surfaces 162, 164 and 166 and are spaced slightly above inner surface 198 to provide access space S (FIG. 23) for receipt of a tool to release spring clip 110 when removal of the support member and rearview mirror from base 132 is desired.

As is best seen in FIG. 23, interior recess 180 also includes an integral mounting stud 200 which receives spring clip 110 thereover for engagement with ribs 156, 158 on the front surface 136 of base member 132 when slidingly received thereover. As in embodiment 10, base member 132 slides into support surfaces 190, 192 and 194, 196 as far as possible with spring arm 114 engaging rib surfaces 157, 159 at a position determined by where the base stops in the support. At the same time, resilient retaining arm 116 engages a central area of sliding contact surface 166 to tightly engage support 175 with base member 132 via contact surfaces 150, 152 and 154, and urge the spring arm tightly into contact with the ribs to prevent both longitudinal and lateral rocking motion and/or vibration.

As in embodiment 10, the differential hardnesses between spring clip 110 and base member 132 allow proper gripping by the sharp corner of free end edge 122 of spring clip 110 on ribs 156, 158. However, the pressure provided by spring arms 114, 116 on base members 130 or 132 (approximately 100 pounds in the preferred embodiments 10 and 130) is not sufficient to break or crack the support members nor create significant creep over long periods of time which would otherwise cause loosening in the mounting. Accordingly, with either embodiments 10 or 130, a secure, uniform mounting assembly is maintained.

Figure 24:
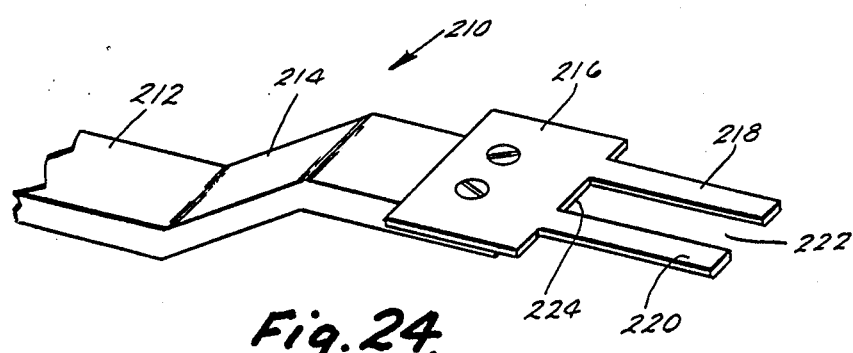
FIG. 24 is a perspective view of one form of a tool used to released and disassemble the mounting assembly of the present invention.
Figure 25:
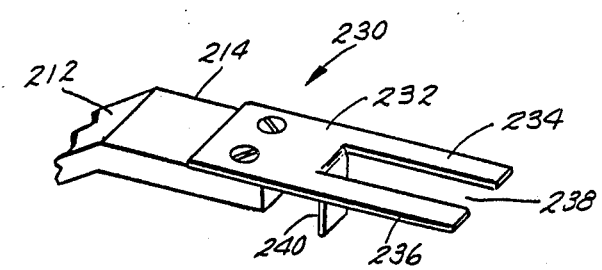
FIG. 25 is a perspective view of a alternate form of the tool used to release the mounting assembly of the present invention.

As shown in FIGS. 24 and 25, alternative types of removal tools may be used with the mounting assemblies to release the spring clip and allow sliding removal of the support 75 or 175 from base member 30 or 132. A first embodiment 210 of the removal tool is shown in FIG. 24 and includes a handle 212 which may have a gooseneck-type configuration for ease in insertion of the tool adjacent the windshield W. Bolted or otherwise secured to, or formed in one piece with the end 214 of handle 212 is a release member 216 including parallel, release prongs 218, 220 defining a space 222 therebetween. Prongs 218, 220 are adapted to slide into space S between base member 30 or 132 and the interior surfaces 93, 95 or 198 of supports 75, 175 to fit on either side of retainer arm 116 and press against the surface of retainer arm 114 to force it away from the ribs on the base members. The length of prongs 218, 220 is greater than the distance from the retainer arm 114 to bottom ends 83, 183 of the support members to allow sufficient room to press the retainer arm away from the base member. End surface 224 of space 222 limits the extent to which prongs 218, 220 may be inserted in space S. When the tool is inserted and pressed against the retainer arm, contact between the sharp edge of the retainer arm and the base member ribs is released and support 75 or 175 may be slid upwardly and off the base member.

An alternative embodiment 230 of the release tool is shown in FIG. 25 and includes handle 212 with a release member 232 bolted to the end 214 of the handle. Release member 232 includes parallel, release prongs 234, 236 defining a space 238 slightly wider than the width of spring arm 116 on spring clip 110. Also included is a stop 240 extending downwardly from the end of space 238 adjacent handle end 214 for contact with the end surface 83 or 183 of one of the support members 75 or 175 when prongs 234, 236 are inserted in space S and moved forwardly to release arm 114 from the base member.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A vehicle accessory mounting assembly for supporting a rearview mirror or another vehicular accessory comprising:
   a base means for attachment to a support surface in a vehicle;
   support means for supporting a vehicle accessory having receiving means for slidably receiving said base means along a predetermined direction of sliding movement with a first surface of said base means opposed to a first surface of said support means, and retainer means on said first surface of said support means for engaging and holding said base means on said support means;
   rib means on said first surface of said base means for engaging said retainer means, said rib means having a retainer engaging surface facing said support means for engaging said holding said retainer means anywhere therealong; said rib means extending along said first surface generally in said direction of sliding movement;
   said retainer means including a first resilient retainer arm engaged with and gripping said retainer engaging surface of said rib means at a gripping position generally along said direction of sliding movement, such gripping position being determined when said receiving means firmly and tightly engages said base means, and a second resilient retainer arm engaging said base means at a position spaced from said gripping to urge said first retainer arm against said retainer engaging surface of said rib means whereby said support means is stably held wherever it comes to rest on said base means until said first retainer arm is released.

2. The assembly of claim 1 wherein said base means has top and bottom ends; said rib means including at least one rib extending generally longitudinally from said top end toward said bottom end; said base means being slidably received longitudinally on said receiving means.

3. The assembly of claim 1 wherein said rib means are arranged on said first surface of said base means with respect to said first resilient retainer arm such that a different portion of said first resilient retainer arm will engage said rib means at each position of said support means on said base means.

4. The assembly of claim 1 wherein said first surface of said base means includes at least three spaced, sliding contact areas and a reserved area therebetween, said sliding contact areas being spaced apart from one another and providing consistent engagement with said first surface of said support means while allowing uniform, tight contact of said base means and said receiving means whereby movement and/or vibration between said base and support means is prevented.

5. The assembly of claim 1 wherein said base means is formed in one piece, said rib means having a relative hardness less than that of said retainer means.

6. The assembly of claim 5 wherein said base means is formed from sintered metal and has a hardness of about Rockwell B75; said retainer means including a spring clip including said first and second retainer arms, said spring clip being formed from spring steel and having a hardness of about Rockwell C40 to Rockwell C50. means includes a spring clip mounted on said first surface of said support means.

7. The assembly of claim 1 wherein said rib means include a pair of ribs each having a retainer engaging surface, said ribs extending at an angle to one another and adapted for simultaneous engagement by portions of said first retainer arm.

8. The assembly of claim 7 wherein said ribs are rectilinear and are arranged in an inverted V such that they diverge from a position adjacent one another at one end of said base means.

9. The assembly of claim 8 wherein said retainer engaging surfaces on said ribs are each generally planar and lie in generally the same plane.

10. The assembly of claim 1 wherein said retainer means, said second spring arm including a rounded surface for engaging said base means.

11. The assembly of claim 10 wherein said spring clip includes a pair of first and second spring arms and a base from which said first and second spring arms extend upwardly, said base including a pair of spaced side flanges extending generally transverse to said spring arms, said first spring arm tapering from said base to a sharp free end edge for gripping said retainer engaging surface of said rib.

12. The assembly of claim 10 wherein said receiving means include a pair of spaced flanges, one flange extending along each lateral side of said support means; said first surface of said support means being recessed between said flanges such that said base means is received in said recess.

13. The assembly of claim 12 wherein said first surface of said support means includes a mounting stud; said spring clip including a pair of spaced first and second spring arms and an aperture between said first and second spring arms and receiving said stud therein.

14. A vehicle accessory mounting assembly for supporting a rearview mirror or another vehicular accessory comprising:

a base means for attachment to a support surface in a vehicle;

support means for supporting a vehicle accessory having receiving means for slidably receiving said base means with a first surface of said base means opposed to a first surface of said support means, and retainer means on said first surface of said support means for engaging and holding said base means on said support means;

rib means on said first surface of said base means for engaging said retainer means, said rib means having a retainer engaging surface facing said support means for engaging and holding said retainer means anywhere therealong;

said retainer means including a first resilient retainer arm engaged with and gripping said retainer engaging surface of said rib means at a gripping position determined when said receiving means firmly and tightly engages said base means, and a second resilient retainer arm engaging said base means at a position spaced from said gripping position to urge said first retainer arm against said retainer engaging surface of said rib means whereby said support means is stably held on said base means until said first retainer arm is released;

said receiving means including a pair of spaced flanges; said base means including spaced surfaces for slidably mating with said respective flanges to form opposing sets of mating surfaces; one set of said mating surfaces including a spaced pair of raised contact areas extending therebetween, the other set of said mating surfaces including at least one raised contact area extending therebetween, said raised contact areas stabilizing the mounting of said base and support members and preventing relative movement and/or vibration therebetween.

15. The assembly of claim 14 wherein said spaced surfaces are formed on opposing side surfaces of said base member, said raised contact areas being formed on said opposing side surfaces of said base member.

16. The assembly of claim 14 wherein said one raised contact area on s id other set of mating surfaces is positioned longitudinally intermediate the positions of said pair of raised contact areas on said one set whereby said contact areas are arranged triangularly.

17. The assembly of claim 16 wherein each of said opposing sets of mating surfaces is inclined toward the other set.

18. The assembly of claim 17 wherein said spaced surfaces and flanges extend longitudinally along the sides of said base and support means respectively, said base means being tapered with said side surfaces converging toward the top of said base means; said flanges converging toward the top of said support means such that said opposing sets of mating surfaces to converge toward one another as said sets extend toward the top of said assembly.

19. The assembly of claim 14 wherein said first surface of said base means includes at least three spaced, sliding contact areas and a relieved area therebetween, said sliding contact areas providing consistent engagement with said first surface of said support means while allowing uniform, tight contact of said base means and said receiving means whereby movement and/or vibration between said base support means is prevented.

20. A vehicle accessory mounting assembly for supporting a rearview mirror or another accessory on a support surface comprising:

a base member adapted to be secured to a support surface and an accessory support member slidably fitted thereover; each of said base member and support member including front, back, top, bottom and opposing side surfaces; said side surfaces of said base member and support member including cooperating means for slidably mounting said support member on said base member such that said front surface of said base member is opposed to a rear facing surface of said support member; said front surface of said base member including a pair of upstanding, divergent ribs; said rear facing surface of said support member including a spring member having a first resilient arm with a sharp edge for simultaneously engaging said divergent ribs and a second resilient arm for engaging a portion of said front surface of said base member at a position spaced from said first arm to stabilize said support member said divergent ribs being arranged on said front surface of said base means with respect to said first resilient arm such that a different portion of said first resilient arm will engage said divergent ribs at each position of said support means on said base member; whereby when said support member is slidably mounted on said base member, said first and second arms urge said cooperating means tightly against each other while said sharp edge of said first arm engages said divergent ribs to prevent sliding removal of said support member from said base member until said first arm is released.

21. A vehicle accessory mounting assembly for supporting a rearview mirror or another vehicle accessory comprising:

a base member for attachment to a support surface in a vehicle;

a support member mounted on said base member for supporting a vehicle accessory;

said base and support members including a spaced pair of cooperating surface means for slidably mounting said support member on said base member, one of said pair of cooperating surface means including a pair of spaced, raised contact areas extending between said cooperating surface means, the other of said pair of cooperating surface means including at least one raised contact area extending therebetween, said raised contact areas providing consistent contact between said cooperating surface means to stabilize mounting of and prevent movement and/or vibration between said base and support members; and spring means on one of said base and support members for engaging the other of said members and retaining said support member on said base member.

22. The assembly of claim 21 wherein said one raised contact area on said other pair of cooperating surface means is positioned longitudinally intermediate the positions of said pair of raised contact areas on said one pair of cooperating surface means whereby said raised contact areas are arranged triangularly.

23. The assembly of claim 22 wherein said spaced pair of cooperating surface means include side surfaces on said base member and flanges on said support member; said side surfaces and flanges being inclined toward one another and converging toward the top of said assembly to provide a double taper on said assembly.

24. The assembly of claim 21 wherein said base member includes a front surface slidably engaging an opposed surface on said support member, said front surface including at least three spaced sliding contact areas and a relieved area therebetween, said sliding contact areas providing consistent engagement between said base and support members while allowing uniform, stable contact between said cooperating surface means.

25. The assembly of claim 24 wherein said base member includes rib means on said front surface for engaging said spring means, said rib means having a retainer engaging surface facing said support member; said spring means including a first resilient retainer arm engaged with and gripping said retainer engaging surface of said rib means at a gripping position determined when said cooperating surface means are firmly engaged, and a second resilient retainer arm engaging said base member at a position spaced from said gripping position to urge said first retainer arm against said retainer engaging surface whereby said support member is stably held on said base member until said first retainer arm is released.

26. A vehicle accessory mounting assembly for supporting a rearview mirror or another vehicle accessory comprising:

a base member for attachment to a support surface in a vehicle, said base member having opposite ends;

a support member mounted on said base member for supporting a vehicle accessory;

said base and support members including cooperating surface means for slidably mounting said support member on said base member;

said base member including a front surface slidably engaging an opposed surface on said support member, said front surface including at least three spaced sliding contact areas and a relieved area therebetween, said sliding contact areas being spaced apart from one another adjacent said opposite end of said base member and providing consistent engagement between said base and support members while allowing uniform, stable contact between said cooperating surface means; and retainer means on one of said base and support member for engaging the other of said members and retaining said support member on said base member;

the other of said base and support members including rib means for engaging said retainer means, said rib means having a retainer engaging surface facing said retainer means.

27. The assembly of claim 26 wherein said retainer means includes a first resilient retainer arm engaged with and gripping said retainer engaging surface of said rib means at a gripping position determined when said support member firmly and tightly engages said base member, and a second resilient retainer arm engaging said base member at a position spaced from said gripping position to urge said first retainer arm against said retainer engaging surface whereby said support member is stably held on said base member until said first retainer arm is released.

28. The assembly of claim 27 wherein said retainer means is a spring clip having a greater hardness than said rib means.

29. A vehicle accessory mounting assembly for supporting a rearview mirror or another vehicle accessory comprising:
   a base member for attachment to a support surface in a vehicle;
   a support member mounted on said base member for supporting a vehicle accessory;
   said base and support members including cooperating surface means for slidably mounting said support member on said base member;
   said base member including a front surface slidably engaging an opposed surface on said support member, said front surface including at least three spaced sliding contact areas and a relieved area therebetween, said sliding contact areas providing consistent engagement between said base and support members while allowing uniform, stable contact between said cooperating surface means; and
   retainer means on one of said base and support member for engaging the other of said member and retaining said support member on said base member;
   the other of said base and support members including rib means for engaging said retainer means, said rib means having a retainer engaging surface facing said retainer means;
   said cooperating surface means including a pair of spaced flanges on said support member and spaced surfaces on said base member for slidably mating with said spaced flanges to form opposing sets of mating surfaces; one set of said mating surfaces including a spaced pair of raised contact areas extending therebetween, the other set of said mating surfaces including at least one raised contact areas extending therebetween, said raised contact areas stabilizing the mounting of said base and support members and preventing relative movement and/or vibration therebetween.

30. A base member for supporting a rearview mirror or another vehicle accessory thereon, said base member comprising:
   a body having front, back, top, bottom and opposing side surfaces;
   said back surface adapted to be secured to a vehicle support surface;
   said front surface including at least one raised rib extending generally longitudinally in a direction generally from top to bottom therealong for engagement with a retainer on an accessory support member;
   one of said opposing side surfaces including a pair of raised contact areas for engaging mating surface on the accessory support member, the other of said opposing side surfaces including at least one raised contact area for engaging another mating surface on the accessory support member.

31. The base member of claim 30 wherein said rib includes a generally flat surface for engagement by the retainer on the accessory support member.

32. The base member of claim 31 including a second raised rib, said ribs extending at an angle to one another and adapted for simultaneous engagement by portions of the retainer on the accessory support member.

33. The base member of claim 32 wherein said ribs are rectilinear and are arranged in an inverted V such that they diverge from a position adjacent one another at said top of said body.

34. The base member of claim 30 wherein said one raised contact area on said other side surface is positioned longitudinally intermediate the positions of said pair of raised contact areas on said one side surface whereby said raised contact areas are arranged triangularly.

35. The base member of claim 34 wherein said side surfaces are inclined toward one another along their lengths such that the spacing between said side surfaces is closest at said back surface of said body.

36. The base member of claim 35 wherein said body is tapered, said side surfaces converging toward one another as they extend toward said top of said body.

37. The base member of claim 30 wherein said front surface includes at least three spaced sliding contact areas and a relieved area therebetween, said sliding contact areas adapted to provide consistent engagement with mating surfaces on the accessory support member while allowing uniform, stable contact of said raised contact areas on said side surfaces and the surfaces mating therewith on the accessory support member.

* * * * *

UNITED STATES PATENT AND TRADEMARK OFFICE
CERTIFICATE OF CORRECTION

PATENT NO. : 4,936,533

DATED : June 26, 1990

INVENTOR(S) : Robert A. Olson

It is certified that error appears in the above-identified patent and that said Letters Patent is hereby corrected as shown below:

Column 1, line 13:

After "include" insert --a--

Column 1, line 37:

"eve" should be --even--

Column 2, line 16:

"an" should be --and-- (second occurrence)

Column 2, line 36:

After "to" insert --a--

Column 3, line 24:

"th®" should be --the-- (second occurrence)

Column 3, line 26:

"area" should be --areas--

Column 3, line 46:

"there by" should be --thereby--

Column 4, line 11:

",the" should be --the--

UNITED STATES PATENT AND TRADEMARK OFFICE
CERTIFICATE OF CORRECTION

PATENT NO. : 4,936,533

DATED : June 26, 1990

INVENTOR(S) : Robert A. Olson

It is certified that error appears in the above-identified patent and that said Letters Patent is hereby corrected as shown below:

Column 4, line 45:

"released" should be --release--

Column 4, line 47:

"of a" should be --of an--

Column 4, line 59:

After "Fig. 1" insert --,--

Column 4, line 61:

"knoWn" should be --known--

Column 5, line 6:

"cup" should be --cups-- and

"outWardly" should be --outwardly--

Column 5, line 8:

After "and" insert --a--

Column 5, line 46:

"explain®d" should be --explained--

UNITED STATES PATENT AND TRADEMARK OFFICE
CERTIFICATE OF CORRECTION

PATENT NO. : 4,936,533
DATED : June 26, 1990
INVENTOR(S) : Robert A. Olson

It is certified that error appears in the above-identified patent and that said Letters Patent is hereby corrected as shown below:

Column 7, line 7:

"82" should be --83--

Column 8, line 3:

"Figs. I" should be --Figs. 1--

Column 9, line 10:

"157, 19" should be --157,159--

Column 9, line 22:

"sidewall" should be --sidewalls--

Column 9, line 56:

"130" should be --30--

Column 10, line 60:

"said" (first occurrence) should be --and--

Column 11, line 4:

After "gripping" insert --position--

Column 11, Claim 4, line 23:

"reserved" should be --relieved--

UNITED STATES PATENT AND TRADEMARK OFFICE
CERTIFICATE OF CORRECTION

PATENT NO. : 4,936,533

DATED : June 26, 1990

INVENTOR(S) : Robert A. Olson

It is certified that error appears in the above-identified patent and that said Letters Patent is hereby corrected as shown below:

Column 11, Claim 6, lines 39 and 40:

Delete "means includes a spring clip mounted on said first surface of said support means.--

Column 11, Claim 10, lines 54 and 55:

Delete "means, said second spring arm including a rounded surface for engaging said base means." and insert therefor --means includes a spring clip mounted on said first surface of said support means.--

Column 11, Claim 11, line 64:

After "rib" insert --means, said second spring arm including a rounded surface for engaging said base means.--

Column 12, Claim 16, line 53:

"s id" should be --said--

UNITED STATES PATENT AND TRADEMARK OFFICE
CERTIFICATE OF CORRECTION

PATENT NO. : 4,936,533

DATED : June 26, 1990

INVENTOR(S) : Robert A. Olson

It is certified that error appears in the above-identified patent and that said Letters Patent is hereby corrected as shown below:

Column 15, Claim 29, line 41:

"areas" should be --area--

Signed and Sealed this

Fifth Day of May, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,936,533
DATED : June 26, 1990
INVENTOR(S) : Edward R. Adams et al.

It is certified that error appears in the above-indentified patent and that said Letters Patent is hereby corrected as shown below:

Column 1, line 13:

After "include" insert --a--

Column 1, line 37:

"eve" should be --even--

Column 2, line 16:

"an" should be --and-- (second occurrence)

Column 2, line 36:

After "to" insert --a--

Column 3, line 24:

"th®" should be --the-- (second occurrence)

Column 3, line 26:

"area" should be --areas--

Column 3, line 46:

"there by" should be --thereby--

Column 4, line 11:

",the" should be --the--

UNITED STATES PATENT AND TRADEMARK OFFICE
CERTIFICATE OF CORRECTION

PATENT NO. : 4,936,533
DATED : June 26, 1990
INVENTOR(S) : Edward R. Adams et al.

It is certified that error appears in the above-indentified patent and that said Letters Patent is hereby corrected as shown below:

Column 4, line 45:

"released" should be --release--

Column 4, line 47:

"of a" should be --of an--

Column 4, line 59:

After "Fig. 1" insert --.--

Column 4, line 61:

"knoWn" should be --known--

Column 5, line 6:

"cup" should be --cups-- and

"outWardly" should be --outwardly--

Column 5, line 8:

After "and" insert --a--

Column 5, line 46:

"explain®d" should be --explained--

UNITED STATES PATENT AND TRADEMARK OFFICE
CERTIFICATE OF CORRECTION

PATENT NO. : 4,936,533
DATED : June 26, 1990
INVENTOR(S) : Edward R. Adams et al.

It is certified that error appears in the above-indentified patent and that said Letters Patent is hereby corrected as shown below:

Column 7, line 7:

"82" should be --83--

Column 8, line 3:

"Figs. I" should be --Figs. 1--

Column 9, line 10:

"157, 19" should be --157, 159--

Column 9, line 22:

"sidewall" should be --sidewalls--

Column 9, line 56:

"130" should be --30--

Column 10, line 60:

"said" (first occurrence) should be --and--

Column 11, line 4:

After "gripping" insert --position--

Column 11, Claim 4, line 23:

"reserved" should be --relieved--

UNITED STATES PATENT AND TRADEMARK OFFICE
CERTIFICATE OF CORRECTION

PATENT NO. : 4,936,533
DATED : June 26, 1990
INVENTOR(S) : Edward R. Adams et al.

It is certified that error appears in the above-indentified patent and that said Letters Patent is hereby corrected as shown below:

Column 11, Claim 6, lines 39 and 40:

Delete "means includes a spring clip mounted on said first surface of said support means.--

Column 11, Claim 10, lines 54 and 55:

Delete "means, said second spring arm including a rounded surface for engaging said base means."

and insert therefor --means includes a spring clip mounted on said first surface of said support means.--

Column 11, Claim 11, line 64:

After "rib" insert --means, said second spring arm including a rounded surface for engaging said base means.--

Column 12, Claim 16, line 53:

"s id" should be --said--

UNITED STATES PATENT AND TRADEMARK OFFICE
CERTIFICATE OF CORRECTION

PATENT NO. : 4,936,533
DATED : June 26, 1990
INVENTOR(S) : Edward R. Adams et al.

It is certified that error appears in the above-indentified patent and that said Letters Patent is hereby corrected as shown below:

Column 15, Claim 29, line 41:

"areas" should be --area--

This certificate supersedes the Certificate of Correction issued on May 5, 1992.

Signed and Sealed this

Twenty-sixth Day of April, 1994

Attest:

BRUCE LEHMAN

*Attesting Officer*   *Commissioner of Patents and Trademarks*